Dec. 28, 1965
E. ROSENBAUM
3,226,570
SHORT PULSE ELIMINATOR DISCRIMINATOR
UTILIZING FEED-BACK TO EFFECT
DESIRED OUTPUT PULSES
Filed Dec. 7, 1962
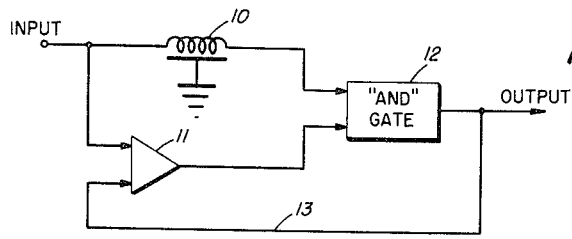
FIG. 1.
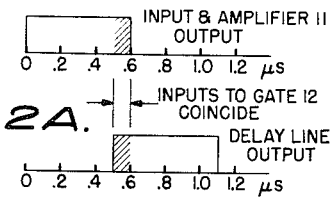
FIG. 2A.
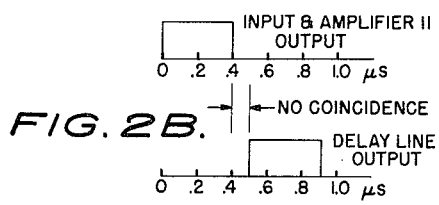
FIG. 2B.
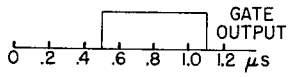
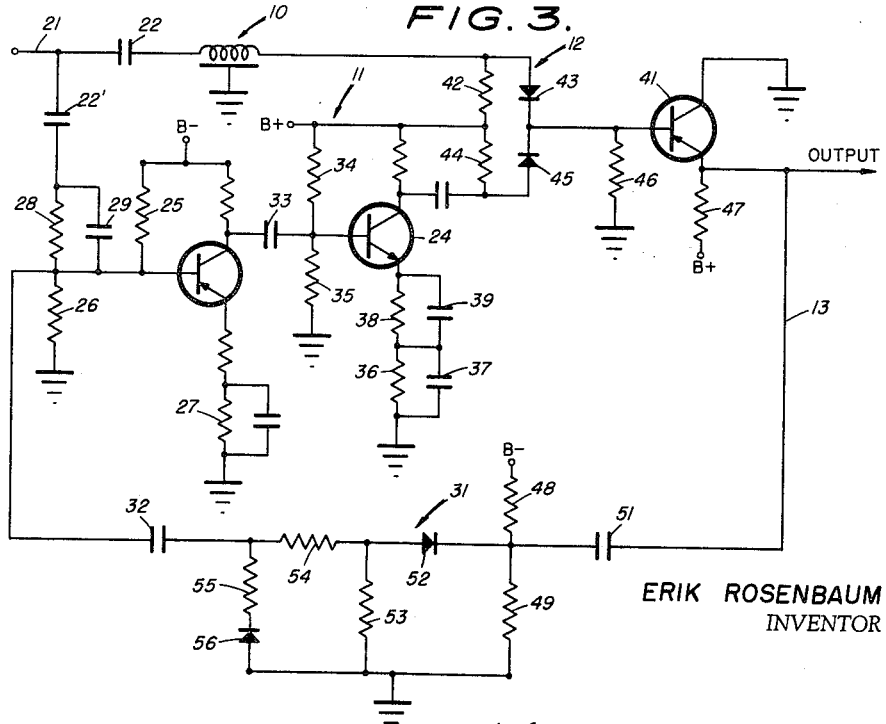
ERIK ROSENBAUM
INVENTOR
BY Killman, Smith & Lamb
ATTORNEYS

United States Patent Office 3,226,570
Patented Dec. 28, 1965

3,226,570
SHORT PULSE ELIMINATOR DISCRIMINATOR UTILIZING FEED-BACK TO EFFECT DESIRED OUTPUT PULSES
Erik Rosenbaum, Baltimore, Md., assignor to The Bendix Corporation, Towson, Md., a corporation of Delaware
Filed Dec. 7, 1962, Ser. No. 242,960
3 Claims. (Cl. 307—88.5)

The present invention relates to pulse comparison circuits. More particularly it relates to a circuit capable of selecting for transmission an electrical impulse of longer duration than a specified minimum pulse length and of rejecting pulses shorter than standard.

The circuit of the invention was devised particularly for inclusion in the transponder of an air traffic control radar beacon system. In this system, ground radars at various control centers along the airway search their surrounding volume of space with a rotating antenna. Transmission is in the form of pairs of pulses of R.F. energy. As opposed to the usual search radar in which echoes of transmitted pulses are received, the receiver of the ATC radar is tuned to a different frequency. Thus, no signals are received by reflection or by direct transmission from other ground transmitters. Controlled aircraft are equipped with transponders arranged to receive signals at the ground radar transmitting frequency and to respond to proper interrogation upon the frequency of the ground radar receivers. This dual frequency system has the advantages of eliminating clutter and jamming by other radars at the ground station and of preventing interference between aircraft.

The radar-transponder combination performs most effectively when the side lobes of the radar transmitter are well suppressed and the transponder responds only to a correct interrogating pulse from the main beam of the radar. Otherwise, a transponding aircraft can appear to be at plural bearings from the radar station, making the precise location of the aircraft impossible to determine. If the transponder responds to interrogations from the side lobes of the radar antenna pattern, the radar loses its directional characteristics. With the usual PPI presentation, the target aircraft will then trace a circle of radius corresponding to correct range but from which the precise bearing of the aircraft cannot be determined. If the transponder mistakes a spurious signal as an interrogation, the indicated range of the aircraft will be in error. If the transponder is responsive both to side lobe radiation and to spurious signals, the radar presentation can be completely unintelligible, both as to range and bearing.

One of the means devised to suppress the effects of radar side lobe radiation is to transmit pulses from an omnidirectional antenna in prearranged sequence with pulses transmitted from the directional antenna. The radiation from the omnidirectional antenna is of greater power than that of the side lobes of the directional antenna but of less power than that radiated by the main beam. The amplitude of the pulses received at the aircraft can be compared and if it appears that the pulses originating from the omnidirectional antenna are of greater amplitude than those from the directional antenna, the directional signal will be recognized as having originated in a side lobe. Occasionally, severe pulse distortion will nevertheless cause an output to appear from the comparison circuits when the directional radiation has originated in a side lobe. Occasionally, also, a distant radar may be capable of causing an output to appear from the comparison circuits. Spurious outputs of such sort are generally of shorter duration than genuine outputs triggered by the main beam of the radar.

One of the objects of the present invention is to provide a means for preventing undesired transmission from a radar beacon.

Another object of the invention is to provide a means for recognizing a probably spurious signal and for preventing response thereto by a transponding beacon.

Still another object is to provide a means for recognizing and rejecting video pulses of shorter than standard duration.

One well known method of eliminating short pulses is to apply the pulse to be tested to a delay line and to a coincidence circuit. The length of the delay line is slightly less than the minimum acceptable pulse length. The output of the delay line is also applied to the coincidence circuit. If the tested pulse exceeds the length of the delay line in duration, the coincidence circuit will provide an output pulse of duration equal only to the amount by which the tested pulse exceeds the delay line length.

Another object of the invention is therefore to provide means for eliminating pulses of shorter than standard duration and for passing pulses of acceptable length without shortening their duration.

A further object is to provide a short pulse eliminator possessed of the foregoing attributes and which is of simplified design and of general utility wherever such means are required.

Other objects and advantages will become evident as an understanding of the invention is gained through study of the following detailed description and accompanying drawings.

Briefly, the present invention comprises a delay line, the length of which establishes the minimum acceptable pulse duration, a coincidence gate circuit and a positive feedback loop around the coincidence gate which sustains gate output for the length of the tested pulse, provided the pulse duration is greater than the delay line length.

In the drawings:

FIG. 1 is a functional block diagram of the invention;
FIGS. 2A and 2B are waveform diagrams helpful in understanding the operation of the invention; and
FIG. 3 is a schematic diagram version of the invention in which transistor amplifiers are employed.

Referring to FIG. 1, the pulse to be tested is applied simultaneously to a delay line 10 and an amplifier 11. The amplifier 11 amplifies and shapes the pulses applied thereto, but does not invert the phase. The outputs of delay line 10 and amplifier 11 are applied to a coincidence circuit which may conveniently comprise a conventional diode "and" gate 12. An output appears from gate 12 upon the simultaneous application of pulses to its two inputs. The gate output is of the same polarity as its inputs. If either of the inputs to the gate are absent, the gate produces no output signal. A positive feedback loop is completed, by way of lead 13, from the output of gate 12 to the input of amplifier 11.

Ordinarily, positive feedback would be expected to produce instability. The application of positive feedback in the present circuit, however, is controlled by gate 12 so that the loop will be closed only as long as an output appears from delay line 10. When the pulse from delay line 10 is completed, gate 12 opens to interrupt the feedback path and prevent oscillation or uncontrolled output from amplifier 11.

The operation of the invention will now be readily understood. A pulse applied at the input of the circuit will appear with inconsequential delay at the output of amplifier 11. The pulse will not appear at the output of delay line 10, however, until after a lapse of time equal to the delay line length. Should the original pulse be of shorter duration than the length of delay line 10, output from amplifier 11 will have disappeared by the time an output appears from delay line 10, and gate 12 will not open. Should the original pulse be of longer duration than the time taken to traverse delay line 10, an output will still be present from amplifier 11 at the time the leading edge of the pulse appears from delay line 10. Gate 12 then opens and feeds back a sustaining input to amplifier 11. Output from gate 12 will continue to flow as long as an output continues from delay line 10. When the delayed pulse terminates, gate 12 opens, terminating its output and restoring amplifier 11 in condition to receive another original pulse input.

The waveforms of FIG. 2 illustrate the operation of the invention for pulses of both acceptable and unacceptable length. In FIG. 2A a delay line length of 0.5 $\mu$s. and a pulse length of 0.6 $\mu$s. have been assumed. It will be seen that following a delay of 0.5 $\mu$s. the trailing edge of the input pulse and the leading edge of the delayed pulse coincide. These pulses overlap for 0.1 $\mu$s. In prior art circuits, the output pulse endures only for as long as the input pulse and the delayed pulse coincide. In accordance with the invention, however, once coincidence of the pulses causes the gate to open an output exists for the duration of the delayed pulse. The performance of circuits which utilize the output pulse can then be substantially improved because only pulses of a known minimum length will be processed. Extremely high frequency response will not be required and improved reliability can be expected.

FIG. 2B illustrates the event of a pulse of shorter length than the delay line length. At the end of 0.4 $\mu$s., the input pulse has expired, while the delayed pulse has not yet appeared at the gate input. The pulses applied to the gate fail to coincide by 0.1 $\mu$s. so that no output results. Thus, pulses of shorter duration than the delay line length are rejected.

FIG. 3 is a schematic diagram of an embodiment of the invention employing transistor amplifiers. Input pulses are applied at lead 21, whence they are coupled by capacitors 22, 22' to a delay line 10 and to the input of an amplifier 11. Amplifier 11 comprises two cascaded stages employing transistors 23 and 24, both connected in common emitter configuration. Transistor 23 is biased by the voltage divider chain including resistors 25, 26 and 27 connected between a negative voltage source and ground. Pulses conducted by capacitor 22' are sharpened in a differentiating network consisting of a resistor 28 and shunt capacitor 29 before application to the base of transistor 23. Pulses from the output of the circuit are fed back to the base of transistor 23 by way of lead 13, a compensating network 31 later to be more fully described, and a capacitor 32. A capacitor 33 applies the signal from transistor 23 to the base of transistor 24. Transistor 24 is biased by a voltage divider consisting of resistors 34 and 35 and an emitter resistor 36. Resistor 36 is bypassed by a comparatively large value capacitor 37. A low value resistor 38 connected in the emitter circuit provides negative signal feedback to improve the stability of transistor 24. Resistor 38 is lighly bypassed by a comparatively low value peaking capacitor 39 in order to provide higher gain for high frequency signal components.

Transistors 23 and 24 are shown as being of opposite conductivity types only because transistors possessing the desired properties are commercially available in such types. Transistor 23 should possess high frequency response but need only deliver a small power output. Transistor 24 should perform well at high frequency and be capable of delivering a larger amount of power than transistor 23. Suitable commercial types are the 2N1499A for transistor 23 and 2N697 for transistor 24.

The phase of signals passing through transistor 23 is inverted and again inverted in transistor 24 so that signals arrive at the output of transistor 24 with the same relative phase as signals at the output of delay line 10.

"And" gate 12 includes a transistor 41 connected as an emitter follower and a biasing network comprising a resistor 42 and a diode 43 connected in series from the positive voltage source to the base of transistor 41. The output of delay line 10 is connected to the junction of resistor 42 and diode 43. An identical resistor 44-diode 45 combination with the output of transistor 24 applied to the junction is connected in parallel with resistor 42-diode 43. The base of transistor 41 is grounded through a resistor 46. A load resistor 47 is connected between the positive voltage source and the emitter of transistor 41.

Diodes 43 and 45 are poled so as to be normally conductive, thus establishing the voltage at the base of transistor 41 to be that determined by the voltage divider consisting of parallel resistance of resistors 42 and 44 and resistor 46. When a negative pulse is applied to the anodes of either of the diodes, the diode receiving the pulse will be cut off. This has the effect of removing one of the resistors 42 or 44 from the voltage divider, but since resistor 46 ordinarily has a resistance substantially larger than that of resistors 42 or 44, the voltage at the base of transistor 41 will change only slightly. If negative pulses are applied to the anodes of diodes 43 and 45 simultaneously, current flow through resistor 46 is almost completely cut off and the voltage at the base of transistor 41 drops virtually to zero. Transistor 41 is then biased heavily in the forward direction and a large negative output results.

The operation of "and" gate 12 is not as perfect as the foregoing brief discussion might suggest. It is desirable for transistor 41 to be lightly conductive even when gate 12 is closed in order that a rapid response will be had for an open gate. Therefore, when only one of the diodes is cut off by a pulse, the slight change in the voltage at the base of transistor 41 will cause a small increment in the current output of the transistor. Because of the positive phasing of the feedback to transistor 41, it is important that even such small outputs as result from the application of a single pulse to the "and" gate be blocked, otherwise the circuit may fail. It is also important to limit the output of transistor 41 to an acceptable maximum value to prevent the saturation of the circuit at high signal levels. The compensating network 31 has a response which is sensitive to the level of the input thereto in order to satisfy these conditions.

Network 31 includes resistors 48 and 48 connected as a voltage divider between the negative voltage source and ground. Signals from lead 13 are applied to the junction of these resistors by a coupling capacitor 51. A diode 52 poled for normal conduction is also connected to the junction of transistors 48 and 49. A high impedance network, the value of which is dominated by the value of resistor 53, is connected to the anode of diode 52 so that the voltage drop across the diode is below its threshold of conductivity with no signal applied through capacitor 51. The small current increment in the output of transistor 41, produced by cutting off one of the diodes of gate 12, will then not alter the voltage drop across diode 52, and no signal will be passed to capacitor 32. The higher signal resulting from the opening of gate 12, however, swings diode 52 into conduction to pass a signal to capacitor 32.

High leved signals passed by diode 52 are limited by the action of the branch of network 31 constituted by resistors 54 and 55 and diode 56. When signals passed through diode 52 are relatively small, say of the order of 1 v., the signal will divide between resistors 54 and 26. The resistance of resistor 54 may suitably be twice as great as that of resistor 26. Then the voltage appearing at the junction of resistors 54 and 55 will be approximately one-third of the voltage appearing at the junction of resistors 53 and 54. When the signal is of the order of 1 v., the voltage at the cathode of diode 56 will be below its threshold of conductivity so that the magnitude of signal applied to transistor 23 will not be effected. When the signal at the junction of resistors 53 and 54 reaches about 1.5 v., however, the threshold of conduction of diode 56 will be exceeded so that the signal applied to transistor 23 will be approximately equal to the voltage drop across the diode. The voltage drop across diode 56 is approximately constant for all applied voltages exceeding the conduction threshold, consequently the signal applied to transistor 23 will be limited to an acceptable maximum value, regardless of the magnitude of the output of transistor 41.

Modifications and variations may be made in the specifically described structure in order to conform to various practical considerations. It should therefore be understood that the scope of the invention is limited solely by the appended claims.

The invention claimed is:

1. A short pulse eliminator circuit for preventing transmission of video pulses of shorter than a minimum desired duration, comprising a delay line requiring a time equal to the minimum desired duration of said pulses for a pulse applied at the input thereof to be propagated its length, an "and" gate including a pair of diodes biased for normal conduction, means applying the output of said delay line to one of the diodes of said gate, an amplifier arranged to provide an output of the same phase as an input thereto, means applying the output of said amplifier to the other diode of said gate, means simultaneously applying a video pulse to the input of said delay and to the input of said amplifier, said pulse being of such polarity as to render the diodes of said gate non-conductive upon application thereto, means feeding back to the input of said amplifier a portion of the output of said gate, and means in said feed-back means for blocking transmission by said feed-back means of spurious outputs from said gate resulting from the non-conduction of only one of said diodes.

2. Apparatus as claimed in claim 1 with additional means in said feed-back means for limiting the amplitude of signals transmitted by said feed-back means.

3. A circuit for transmitting video pulses of longer than a desired minimum time duration and for blocking the transmission of pulses of a shorter duration, comprising a delay line having a length equal to the desired minimum time duration of pulses to be transmitted, an amplifier providing an output of the same phase as signals applied to the input thereof, an "and" gate having a pair of input means, said gate providing an output upon the application of signals of like phase simultaneously to the input means thereof, one of said input means being arranged to receive pulses transmitted by said delay line, the other of said input means being arranged to receive the output of said amplifier, means applying video pulses simultaneously to said delay line and to said amplifier, and means applying a portion of the output of said gate to the input of said amplifier, said means including a network having a series diode for blocking signals of an amplitude below the threshold of conduction of said diode and a shunt diode for limiting the amplitude of signals passed by said series diode.

References Cited by the Examiner
UNITED STATES PATENTS

| | | | |
|---|---|---|---|
| 2,748,269 | 5/1956 | Slutz | 328—164 |
| 2,892,936 | 6/1959 | Paivinen | 328—55 |
| 3,036,224 | 5/1962 | Abraham | 328—171 |
| 3,036,272 | 5/1962 | Vezu | 328—56 |

ARTHUR GAUSS, *Primary Examiner.*